US012169090B2

(12) United States Patent
Ito (10) Patent No.: US 12,169,090 B2
(45) Date of Patent: Dec. 17, 2024

(54) REFRIGERATION CYCLE APPARATUS

(71) Applicant: Mitsubishi Electric Corporation, Tokyo (JP)

(72) Inventor: Masahiro Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 458 days.

(21) Appl. No.: 18/000,149

(22) PCT Filed: Jul. 3, 2019

(86) PCT No.: PCT/JP2019/026525
§ 371 (c)(1),
(2) Date: Nov. 29, 2022

(87) PCT Pub. No.: WO2021/001969
PCT Pub. Date: Jan. 7, 2021

(65) Prior Publication Data
US 2023/0204276 A1    Jun. 29, 2023

(51) Int. Cl.
*F25B 47/02*        (2006.01)
*F24F 11/41*        (2018.01)
*F25B 25/00*        (2006.01)
*F25B 49/02*        (2006.01)
*F25D 21/00*        (2006.01)
(Continued)

(52) U.S. Cl.
CPC ............ *F25D 21/006* (2013.01); *F24F 11/41* (2018.01); *F25B 25/005* (2013.01); *F25B 47/025* (2013.01); *F25B 49/02* (2013.01); *F25D 21/008* (2013.01); *F25D 21/08* (2013.01); *F25B 13/00* (2013.01); *F25B 2313/003* (2013.01); *F25B 2339/047* (2013.01); *F25B 2500/19* (2013.01);
(Continued)

(58) Field of Classification Search
CPC ...... F25B 25/005; F25B 47/025; F25B 49/02; F25B 2313/003; F25B 2339/047; F25B 2500/19; F25B 2600/0253
See application file for complete search history.

(56) References Cited

FOREIGN PATENT DOCUMENTS

| EP | 2784414 A1 | 10/2014 |
|---|---|---|
| JP | 2013-036683 A | 2/2013 |
| JP | 2013-108732 A | 6/2013 |

OTHER PUBLICATIONS

International Search Report of the International Searching Authority mailed Sep. 3, 2019 for the corresponding International application No. PCT/JP2019/026525 (and English translation).

*Primary Examiner* — Jonathan Bradford
(74) *Attorney, Agent, or Firm* — Posz Law Group, PLC (57) ABSTRACT

A control device controls a heating capacity during a heating operation and a defrosting capacity during a defrosting operation. The defrosting capacity of the first refrigeration cycle unit is determined to fall within a range satisfying a first determination condition and within a range satisfying a second determination condition. The first determination condition is a condition that a sum of a load capacity of a load device when the first defrosting start condition is satisfied, and the defrosting capacity of the first refrigeration cycle unit does not exceed the heating capacity of a second refrigeration cycle unit. The second determination condition is a condition that a sum of an inter-unit defrosting interval and a defrosting period of the first refrigeration cycle unit does not exceed a shortest defrosting interval of the second refrigeration cycle unit.

6 Claims, 8 Drawing Sheets

(51) Int. Cl.
*F25D 21/08* (2006.01)
*F25B 13/00* (2006.01)

(52) U.S. Cl.
CPC ... *F25B 2600/0253* (2013.01); *F25B 2600/23* (2013.01)

REFRIGERATION CYCLE APPARATUS

CROSS-REFERENCE TO RELATED APPLICATION

This application is a U.S. national stage application of PCT/JP2019/026525 filed on Jul. 3, 2019, the contents of which are incorporated herein by reference.

TECHNICAL FIELD

The present invention relates to a refrigeration cycle apparatus.

BACKGROUND

Indirect air conditioning apparatuses have been known that generate cool water or hot water by a heat source device such as heat pump, and transfer the cool water or hot water through a water pump and a pipe to an indoor unit, to thereby cool or heat the indoor air.

Such indirect air conditioning apparatuses have been of interest in recent years, because they use water or brine as a heat medium for the heat use side, and thus allow reduction of the amount of refrigerant to be used.

Japanese Patent Laying-Open No. 2013-108732 discloses a defrosting method for a heat pump system that avoids, as much as possible, overlapping of respective defrosting periods of two or more heat pumps, to enable prevention of water temperature decrease in a water pipe.

PATENT LITERATURE

PTL 1: Japanese Patent Laying-Open No. 2013-108732

If defrosting by two or more heat pumps in respective periods overlapping each other is to be avoided, like the defrosting method disclosed in Japanese Patent Laying-Open No. 2013-108732, the water temperature could be lowered unless the possibility of load variations of a water load device that uses heat of water is taken into consideration. For example, water temperature decrease could be caused by overlapping defrosting periods of two or more heat pumps, or could be caused by lowered heat pump capacity due to delayed start of defrosting by a heat pump relative to another heat pump that starts defrosting earlier.

SUMMARY

The present invention has been made to solve the above problems, and an object of the present invention is to provide a refrigeration cycle apparatus capable of suppressing temperature decrease of a heat medium, while avoiding overlapping of respective defrosting periods of a plurality of refrigeration cycle units that control the temperature of a heat medium such as water or brine.

The present disclosure relates to a refrigeration cycle apparatus. The refrigeration cycle apparatus includes: a first refrigeration cycle unit and a second refrigeration cycle unit disposed in a common circulation path for a heat medium, each of the first refrigeration cycle unit and the second refrigeration cycle unit having an independent refrigerant circuit using refrigerant, each of the first refrigeration cycle unit and the second refrigeration cycle unit being configured to control temperature of the heat medium; and a control device configured to control a heating capacity during a heating operation and a defrosting capacity during a defrosting operation of each of the first refrigeration cycle unit and the second refrigeration cycle unit. When a first defrosting start condition is satisfied, the control device is configured to determine the defrosting capacity in the defrosting operation of the first refrigeration cycle unit, and start the defrosting operation.

The defrosting capacity of the first refrigeration cycle unit is determined to fall within a range satisfying a first determination condition and within a range satisfying a second determination condition. The first determination condition is a condition that a sum of a load capacity of a load device using heat of the heat medium when the first defrosting start condition is satisfied, and the defrosting capacity of the first refrigeration cycle unit does not exceed the heating capacity of the second refrigeration cycle unit. The second determination condition is a condition that a sum of an inter-unit defrosting interval and a defrosting period of the first refrigeration cycle unit does not exceed a shortest defrosting interval of the second refrigeration cycle unit, where the shortest defrosting interval is a period when the second refrigeration cycle unit is operated at an upper limit of the heating capacity, and the inter-unit defrosting interval is a period from a time when the defrosting operation of the second refrigeration cycle unit is completed immediately before, to a time when the first defrosting start condition is satisfied.

With the refrigeration cycle apparatus of the present disclosure, the defrosting capacity is determined appropriately at the start of defrosting, and therefore, temperature decrease of a heat medium can be suppressed while overlapping of respective defrosting periods of a plurality of refrigeration cycle units that control the temperature of the heat medium is avoided.

DETAILED DESCRIPTION

Embodiments of the present invention are described hereinafter in detail, with reference to the drawings. In the following, a plurality of embodiments are described, and it is intended originally that features described in conjunction with respective embodiments may be combined appropriately. In the drawings, the same or corresponding components are denoted by the same reference characters, and a description thereof is not herein repeated.

Figure 1:
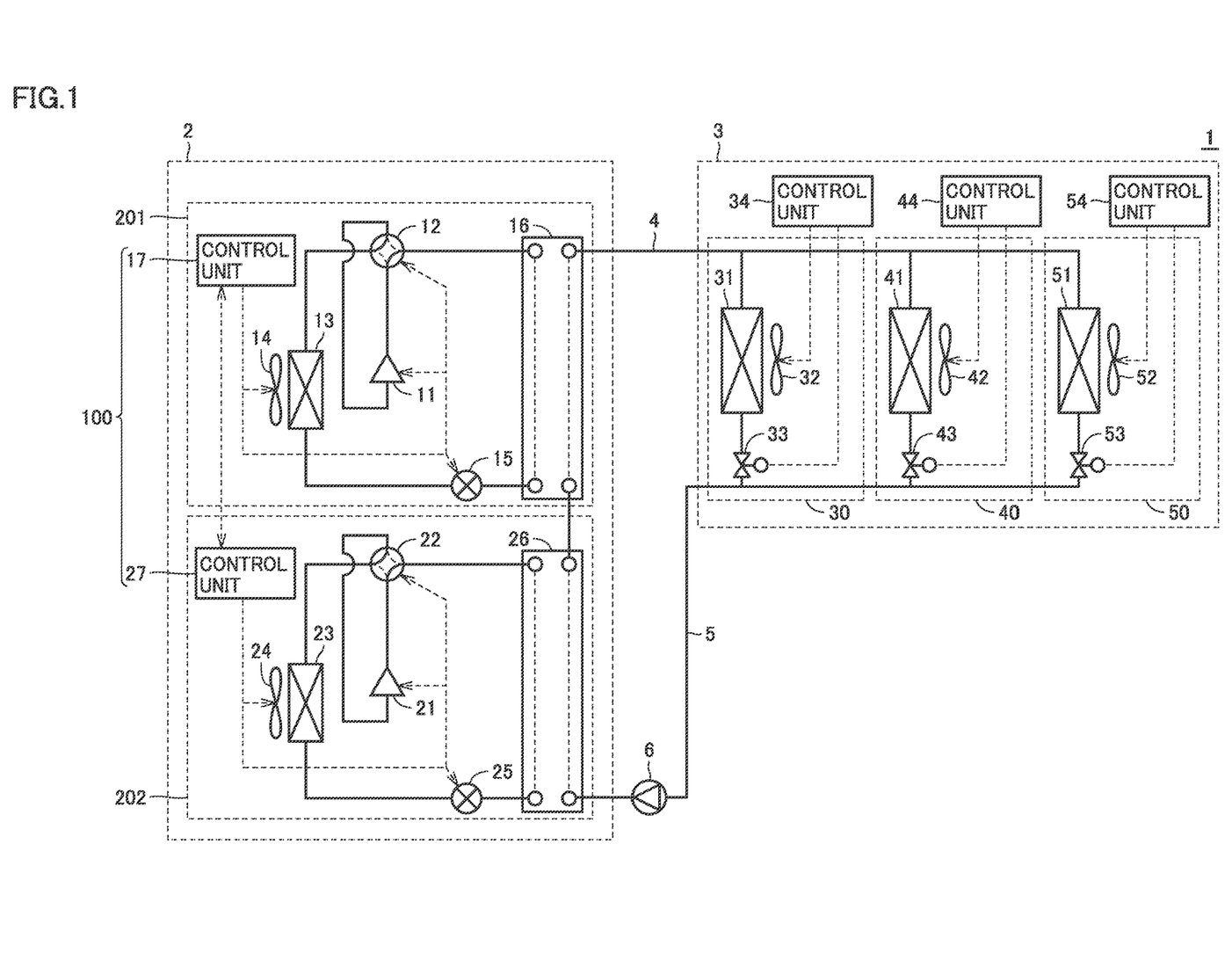
FIG. 1 shows a configuration of an air conditioning apparatus according to the present embodiment.

FIG. 1 shows a configuration of an air conditioning apparatus according to the present embodiment. Referring to FIG. 1, air conditioning apparatus 1 includes a heat source device 2, a load device 3, pipes 4, 5, and a pump 6. Heat source device 2 is a refrigeration cycle apparatus including a first refrigeration cycle unit 201 and a second refrigeration cycle unit 202.

In each of first refrigeration cycle unit 201 and second refrigeration cycle unit 202, a circulation path for refrigerant is formed. A heat medium is circulated between heat source device 2 and load device 3, through pipes 4, 5 and pump 6. In the following description, water is exemplified as a heat medium. The heat medium, however, may be brine or the like. For the sake of simplifying the description, the temperature of the heat medium may be referred to herein as water temperature.

First refrigeration cycle unit 201 and second refrigeration cycle unit 202 are connected in series with a water circulation path, and are both configured to operate as a heat source or a cold source for water.

First refrigeration cycle unit 201 includes a compressor 11, a four-way valve 12, a first heat exchanger 13, a fan 14, an electronic expansion valve 15, and a second heat exchanger 16.

Second refrigeration cycle unit 202 includes a compressor 21, a four-way valve 22, a first heat exchanger 23, a fan 24, an electronic expansion valve 25, and a second heat exchanger 26.

Compressors 11, 21 compress refrigerant. First heat exchangers 13, 23 exchange heat between refrigerant and outside air blown by respective fans 14, 24. Second heat exchangers 16, 26 exchange heat between refrigerant and water. Plate heat exchangers, for example, may be used as second heat exchangers 16, 26.

FIG. 1 illustrates a case where four-way valves 12, 22 are set to perform heating. In this case, first refrigeration cycle unit 201 and second refrigeration cycle unit 202 each act as a heat source. This heating condition is switched to a cooling or defrosting condition by switching four-way valves 12, 22 to reverse the refrigerant circulation direction, so that first refrigeration cycle unit 201 and second refrigeration cycle unit 202 each act as a cold source.

Heat source device 2 and load device 3 are connected to each other by pipes 4, 5 that allow water to flow. Load device 3 includes an indoor unit 30, an indoor unit 40, and an indoor unit 50. Indoor units 30, 40, 50 are connected in parallel to each other, between pipe 4 and pipe 5.

Indoor unit 30 includes a heat exchanger 31, a fan 32 for blowing indoor air to heat exchanger 31, and a flow rate adjustment valve 33 that adjusts the flow rate of water. Heat exchanger 31 exchanges heat between water and indoor air.

Indoor unit 40 includes a heat exchanger 41, a fan 42 for blowing air to heat exchanger 41, and a flow rate adjustment valve 43 that adjusts the flow rate of water. Heat exchanger 41 exchanges heat between water and indoor air.

Indoor unit 50 includes a heat exchanger 51, a fan 52 for blowing air to heat exchanger 51, and a flow rate adjustment valve 53 that adjusts the flow rate of water. Heat exchanger 51 exchanges heat between water and indoor air.

A water circuit using water is formed by pump 6, second heat exchangers 16, 26 connected in series to each other, and heat exchanger 31, heat exchanger 41, and heat exchanger 51 that are connected in parallel to each other. In the present embodiment, an air conditioning apparatus having two refrigeration cycle units and three indoor units are given by way of example. The number of refrigeration cycle units may be three or more, and the number of indoor units may be any number.

Control units 17, 27 that are arranged separately in first refrigeration cycle unit 201 and second refrigeration cycle unit 202, respectively, work in cooperation with each other to operate as a control device 100. Control device 100 controls compressors 11, 21, four-way valves 12, 22, fans 14, 24, and electronic expansion valves 15, 25, in accordance with settings given from a remote controller or the like (not shown), and respective outputs of a pressure sensor and a temperature sensor.

Load device 3 also includes control units 34, 44, 54 associated with indoor units 30, 40, 50, respectively. Control units 34, 44, 54 control flow rate adjustment valves 33, 43, 53 and fans 32, 42, 52, respectively.

Any one of control units 17, 27, 34, 44, 54 may serve as a control device to perform control. The control device in this case controls compressors 11, 21, four-way valves 12, 22, fans 14, 24, electronic expansion valves 15, 25, pump 6, flow rate adjustment valves 33, 43, 53, and fans 32, 42, 52, based on data detected by other control units.

Figure 2:
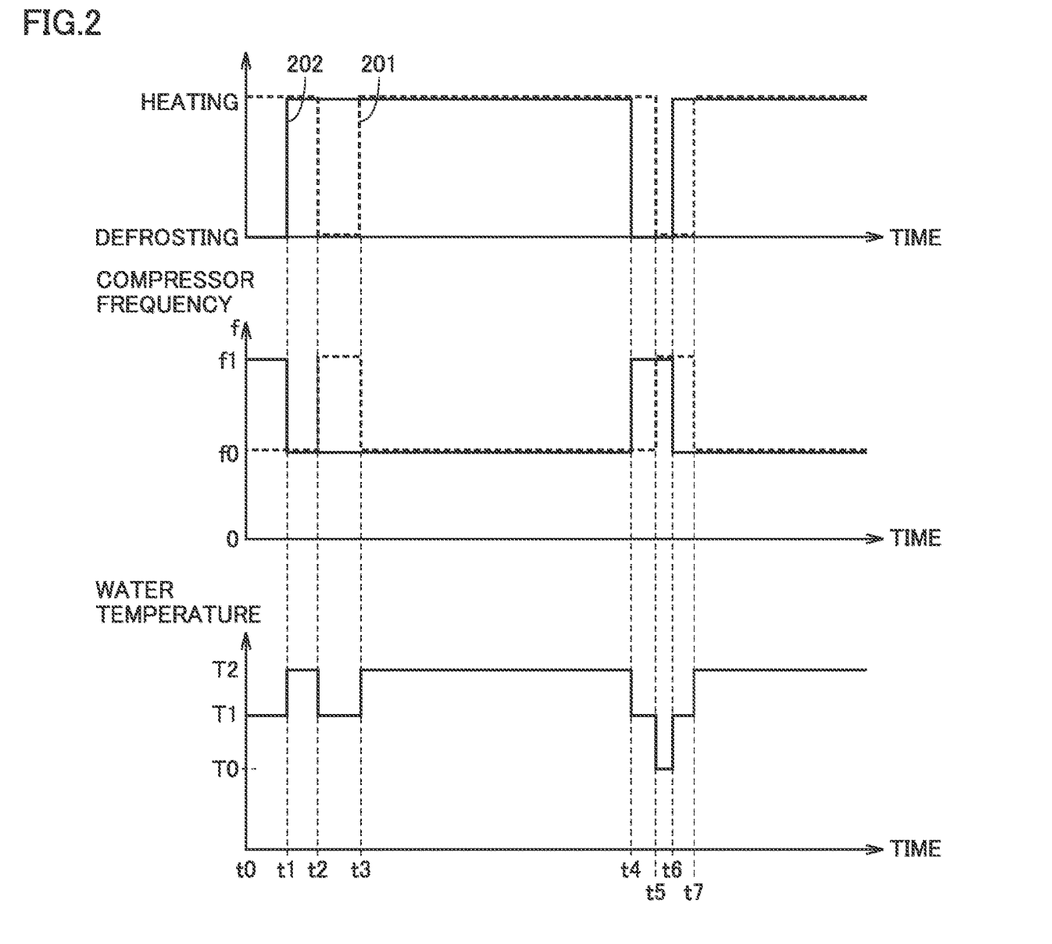
FIG. 2 is a waveform chart illustrating change of the water temperature when defrosting periods overlap each other.

FIG. 2 is a waveform chart illustrating change of the water temperature when defrosting periods overlap each other. Referring to FIGS. 1 and 2, from time t0 to time t1, first refrigeration cycle unit 201 performs heating operation at an operational frequency f0 of compressor 11 and second refrigeration cycle unit 202 performs defrosting operation at an operational frequency f1 (f1>f0) of compressor 21.

The defrosting period should be as short as possible, and therefore, operational frequency f1 of the compressor during defrosting is set to an upper limit frequency that is allowed during operation.

At time t1, defrosting operation by second refrigeration cycle unit 202 is completed. From time t1 to time t2, both first refrigeration cycle unit 201 and second refrigeration cycle unit 202 perform heating operation.

At time t2, a defrosting start condition, namely a condition for starting defrosting, for first refrigeration cycle unit 201 is satisfied. From time t2 to time t3, first refrigeration cycle unit 201 performs defrosting operation at operational frequency f1 of compressor 11 and second refrigeration cycle unit 202 performs heating operation at operational frequency f0 (f1>f0) of compressor 21.

At time t3, defrosting operation by first refrigeration cycle unit 201 is completed. From time t3 to time t4, both first refrigeration cycle unit 201 and second refrigeration cycle unit 202 perform heating operation.

If, however, the start of defrosting operation is determined independently for each of first refrigeration cycle unit 201 and second refrigeration cycle unit 202, respective defrosting periods may overlap each other. In the example shown in FIG. 2, second refrigeration cycle unit 202 performs defrosting operation from time t4 to time t6 while first refrigeration cycle unit 201 performs defrosting operation from time t5 to time t7. Then, overlapping of respective defrosting periods of first refrigeration cycle unit 201 and second refrigeration cycle unit 202 occurs from time t5 to time t6.

If such an operation is performed, the water temperature of water flowed through first refrigeration cycle unit 201 and second refrigeration cycle unit 202 and delivered from an outlet of heat source device 2 to pipe 4 changes as shown in the bottom part of FIG. 2. Specifically, during periods like periods from t0 to t1, from t2 to t3, from t4 to t5, and from t6 to t7 in which one refrigeration cycle unit performs defrosting, the water temperature is decreased from temperature T2 to temperature T1. In contrast, in the period from time t5 to t6 in which respective defrosting periods of the two refrigeration cycle units overlap each other, the water temperature is further decreased to T0.

In the present embodiment, in order to suppress such decrease of the water temperature, control device 100 adjusts the heating capacity and the defrosting capacity of first and second refrigeration cycle units 201, 202 in such a manner that does not change the amount of heat supplied via water from these two refrigeration cycle units 201, 202 to load device 3. Further, after adjusting the defrosting capacity in this manner, control device 100 predicts whether or not respective defrosting periods overlap each other and determines, if overlapping of the defrosting periods is unavoidable, the defrosting capacity with a priority given to avoidance of overlapping of respective defrosting periods.

In the following, a description is given of adjustment of the heating capacity and the defrosting capacity, using FIGS. 3 to 5. For the sake of simplifying the description, it is supposed here that respective abilities of first refrigeration cycle unit 201 and second refrigeration cycle unit 202 are identical to each other and the heating capacity per refrigeration cycle unit at the upper limit frequency of the compressor is 100%.

Figure 3:
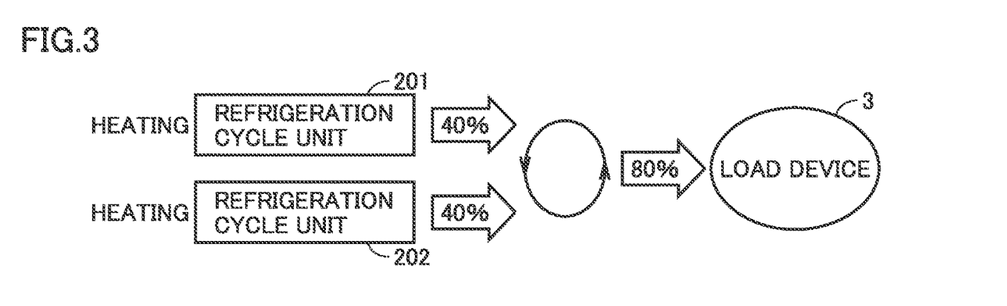
FIG. 3 shows a heating capacity and a load capacity of a load device during heating.

FIG. 3 shows a heating capacity and a load capacity of a load device during heating. In FIG. 3, both first refrigeration cycle unit 201 and second refrigeration cycle unit 202 perform heating operation, and the heating capacity of each refrigeration cycle unit is 40%. Heat corresponding to a total heating capacity of 80% is thus transferred into the water circulation path. Meanwhile, load device 3 performs heating, using heat corresponding to this 80%. Accordingly, the balance between the heat transferred into the water circulation path from first refrigeration cycle unit 201 and second refrigeration cycle unit 202, and the heat discharged from the water circulation path to load device 3 is zero, and accordingly, the water temperature at the outlet of heat source device 2 is constant.

Figure 4:
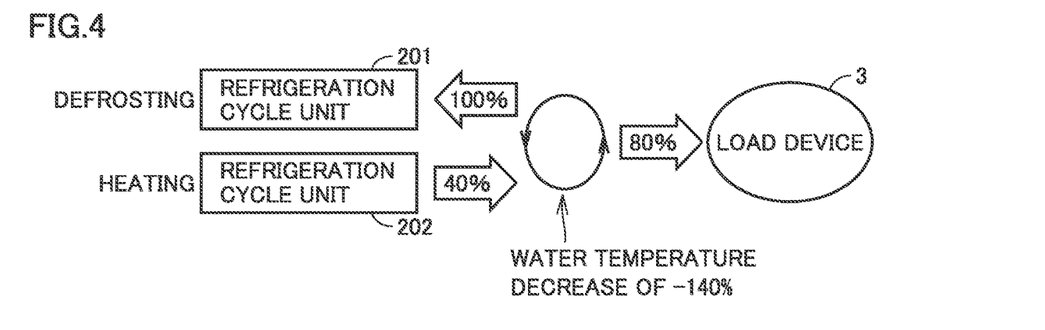
FIG. 4 shows a heating capacity and a load capacity of a load device during defrosting, when the defrosting capacity and the heating capacity are not adjusted.
Figure 5:
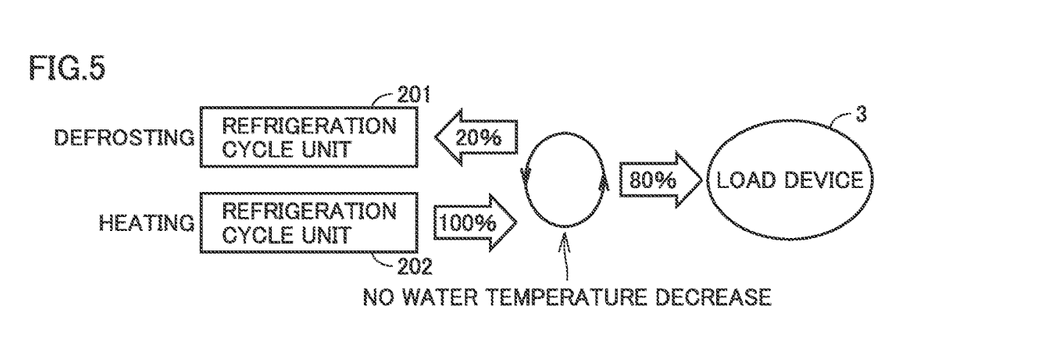
FIG. 5 shows a heating capacity and a load capacity of a load device during defrosting, when the defrosting capacity and the heating capacity are adjusted.

FIG. 4 shows a heating capacity and a load capacity of a load device during defrosting, when the defrosting capacity and the heating capacity are not adjusted.

Usually the defrosting capacity of first refrigeration cycle unit 201 is set to 100% corresponding to the upper limit frequency of the compressor, in order to end defrosting as soon as possible. At this time, if the heating capacity of second refrigeration cycle unit 202 is kept at 40% which is unchanged from the heating capacity shown in FIG. 3, the heat balance of the water circulation path is: ΔQ=40%−100%−80%, and the heat corresponding to −140% is thus transferred from the water circulation path. As a result, the water temperature is decreased. At this time, even if the heating capacity of second refrigeration cycle unit 202 is increased to 100%, the heat corresponding to −80% will be transferred from the water circulation path.

In the present embodiment, the defrosting capacity and the heating capacity are adjusted, in order to prevent such temperature decrease. FIG. 5 shows a heating capacity and a load capacity of a load device during defrosting, when the defrosting capacity and the heating capacity are adjusted.

The amount of heat discharged to the load device is the amount corresponding to 80%, as seen from FIG. 3. If the same amount of heat is transferred from first refrigeration cycle unit 201 and second refrigeration cycle unit 202 to the water circulation path, the water temperature is kept constant.

Control device 100 first raises the heating capacity of second refrigeration cycle unit 202 which is one of the refrigeration cycle units that does not perform defrosting, to 100% corresponding to the upper limit frequency of the compressor. At this time, heat corresponding to 80% is used by the load device side. Then, in order not to change the water temperature, the defrosting capacity of first refrigeration cycle unit 201 may be lowered to 20%. Accordingly, the heat balance of the water circulation path is: ΔQ=100%−20%−80%, and is therefore zero. The water temperature thus remains unchanged. In the present embodiment, such adjustments are made as long as no overlapping of defrosting periods occur.

Figure 6:
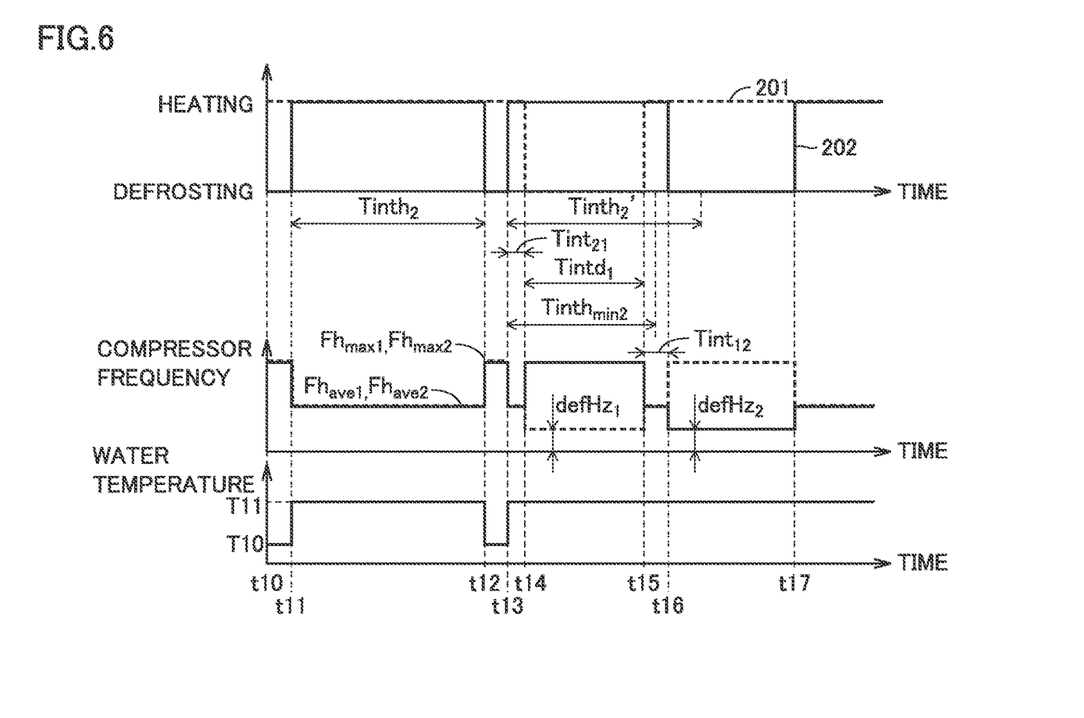
FIG. 6 is a waveform chart illustrating change of the water temperature when the defrosting capacity and the heating capacity are adjusted.

FIG. 6 is a waveform chart illustrating change of the water temperature when the defrosting capacity and the heating capacity are adjusted. From time t10 to time t13, an example of defrosting by second refrigeration cycle unit 202 with a defrosting capacity of 100% is illustrated. After t13, an example of defrosting by first refrigeration cycle unit 201 with the defrosting capacity adjusted is illustrated.

Initially, from time t10 to time t11, second refrigeration cycle unit 202 performs defrosting operation while first refrigeration cycle unit 201 performs heating operation. The defrosting capacity of second refrigeration cycle unit 202 is set to 100% and the heating capacity of first refrigeration cycle unit 201 is also set to 100% so as to make a water temperature decrease as small as possible. At this time, the compressor frequency of first refrigeration cycle unit 201 and second refrigeration cycle unit 202 is set to Fmax. During this period, heat is discharged from the water circulation path to load device 3, so that the heat balance is negative and the water temperature at the outlet of heat source device 2 has been decreased to T10. From time t11 to time t12, both first refrigeration cycle unit 201 and second refrigeration cycle unit 202 perform heating operation. At this time, respective compressor frequencies are set to $Fh_{ave1}$, $Fh_{ave2}$, so that the total heating capacity of first refrigeration cycle unit 201 and second refrigeration cycle unit 202 is equal to the load capacity of load device 3. During this period, the water temperature is stable at T11.

From time t12 to time t13, second refrigeration cycle unit 202 performs defrosting, similarly to defrosting from time t10 to time t11, and the water temperature has been decreased to T10.

For the above process, control unit 27 of second refrigeration cycle unit 202 stores defrosting interval $Tinth_2$ that is a period from the end of defrosting at time t11 to the start of defrosting at time t12.

At time t14, a defrosting start condition of first refrigeration cycle unit 201 is satisfied. In the present embodiment, in order to balance the load capacity, the heating capacity, and the defrosting capacity, each capacity is estimated and adjusted at the time when defrosting by first refrigeration cycle unit 201 is started.

As described above in conjunction with FIG. 3, the total value of respective heating capacities of first refrigeration cycle unit 201 and second refrigeration cycle unit 202 can be calculated at the time when defrosting is started, and accordingly, the load capacity of the load device during defrosting can be estimated.

Control unit 17 cooperates with control unit 27 to calculate the defrosting capacity after the adjustment as described above in conjunction with FIG. 5, and determines whether or not the total of a defrosting period $Tintd_1$ in which defrosting is performed with the adjusted defrosting capacity, and the time difference (hereinafter referred to as "inter-unit defrosting interval") $Tint_{21}$ from the end of defrosting by one of the two refrigeration cycle units and the start of defrosting by the other refrigeration cycle unit, is shorter than shortest defrosting interval $Tinth_{min2}$.

For the same amount of frost, if the defrosting capacity is decreased, the defrosting period should be increased. Supposing that the defrosting period is inversely proportional to the defrosting capacity, the resultant defrosting period is a value determined by multiplying the original defrosting period by the reciprocal of the ratio of the changed defrosting capacity to the original defrosting capacity. For example, in the example shown in FIGS. 4 and 5, the defrosting capacity is decreased from 100% to 20%. Then, the resultant defrosting period is five times as long as the original defrosting period.

The defrosting interval is an interval (the time difference from the end of defrosting to the start of defrosting) for the refrigeration cycle unit that performs defrosting. It is supposed that, with increase of the heating capacity, the amount of frost increases and accordingly the defrosting interval is shortened. Then, the shortest defrosting interval $Tinth_{min2}$ is a value determined by multiplying the immediately preceding defrosting interval $Tinth_2$ by the ratio of the immediately preceding heating capacity to the upper limit heating capacity. For example, if the heating capacity is increased from 50% to 100%, the defrosting interval is shortened to a half of the original defrosting interval.

Defrosting period $Tintd_1$ determined in consideration of the decrease of the compressor frequency during defrosting should be less than or equal to the total of shortest defrosting interval $Tinth_{min2}$ and inter-unit defrosting interval $Tint_{21}$. Then, even if the load capacity of load device 3 is increased, for example, and accordingly the heating capacity is increased, first refrigeration cycle unit 201 and second refrigeration cycle unit 202 will not start defrosting simultaneously.

In FIG. 6, $Tinth_{min2} > Tintd_1 + Tint_{21}$ is satisfied. From time t14 to time t15, the decreased defrosting capacity results in the decrease of the compressor frequency of first refrigeration cycle unit 201 to $defHz_1$. Meanwhile, the defrosting period (t14 to t15) of first refrigeration cycle unit 201 is increased relative to the immediately preceding defrosting period (t12 to t13) of second refrigeration cycle unit 202.

At time t15, defrosting by first refrigeration cycle unit 201 is completed. From time t15 to time t16, first refrigeration cycle unit 201 and second refrigeration cycle unit 202 perform heating operation with the same heating capacity as that from time t11 to time t12.

At time t16, a defrosting start condition for second refrigeration cycle unit 202 is satisfied. At this time, in order to balance the load capacity, the heating capacity, and the defrosting capacity, each capacity is estimated and adjusted at the time when defrosting by second refrigeration cycle unit 202 is started, similarly to the one at time t14. From time t16 to time t17, second refrigeration cycle unit 202 performs defrosting operation.

As shown from time t13 in FIG. 6, the refrigeration cycle apparatus in the present embodiment avoids simultaneous defrosting by the two refrigeration cycle units while reducing the defrosting capacity, and can therefore suppress decrease of the water temperature during defrosting.

Figure 7:
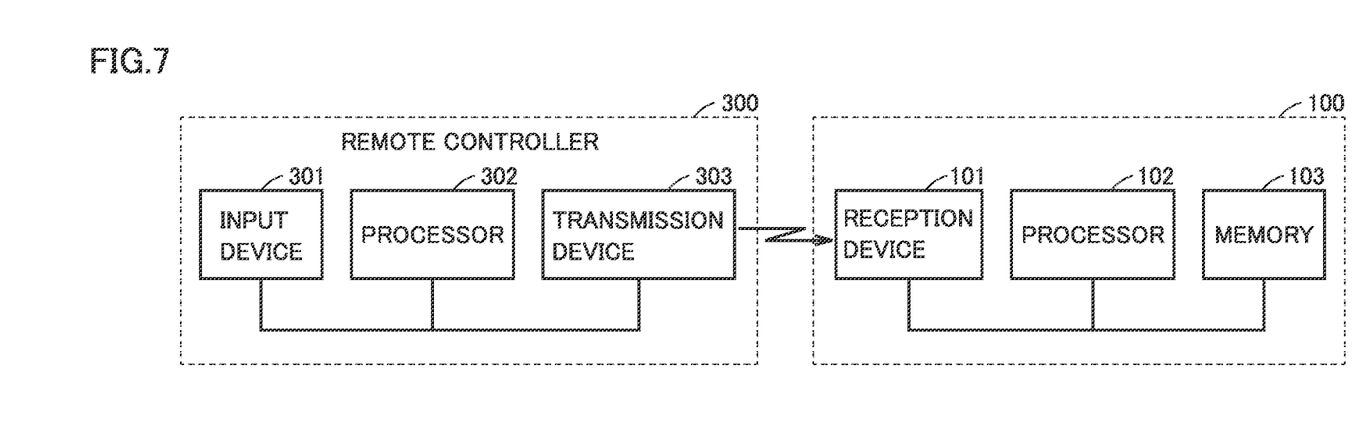
FIG. 7 shows a configuration of a control device that controls the air conditioning apparatus, and a remote controller that remotely controls the control device.

FIG. 7 shows a configuration of a control device that controls the air conditioning apparatus, and a remote controller that remotely controls the control device. Referring to FIG. 7, remote controller 300 includes an input device 301, a processor 302, and a transmission device 303. Input device 301 includes a push button for a user to switch on/off an indoor unit, a button for inputting a set temperature, and the like. Transmission device 303 is configured for making communication with control device 100. Processor 302 controls transmission device 303 in accordance with an input signal provided from input device 301.

Control device 100 includes a reception device 101 receiving a signal from the remote controller, a processor 102, and a memory 103.

Memory 103 is configured to include, for example, a ROM (Read Only Memory), a RAM (Random Access Memory), and a flash memory. In the flash memory, an operating system, an application program, and various types of data are stored.

Processor 102 controls the overall operation of air conditioning apparatus 1. Control device 100 shown in FIG. 1 is implemented through execution, by processor 102, of the operating system and the application program stored in memory 103. For execution of the application program, various types of data stored in memory 103 are referenced. Reception device 101 is configured for making communication with remote controller 300. When a plurality of indoor units are arranged, reception device 101 is provided for each of these indoor units.

If a control device is implemented as a plurality of control units as shown in FIG. 1, the processor is included in each of these control units. In such a case, a plurality of processors cooperate with each other to perform the overall control of air conditioning apparatus 1.

Figure 8:
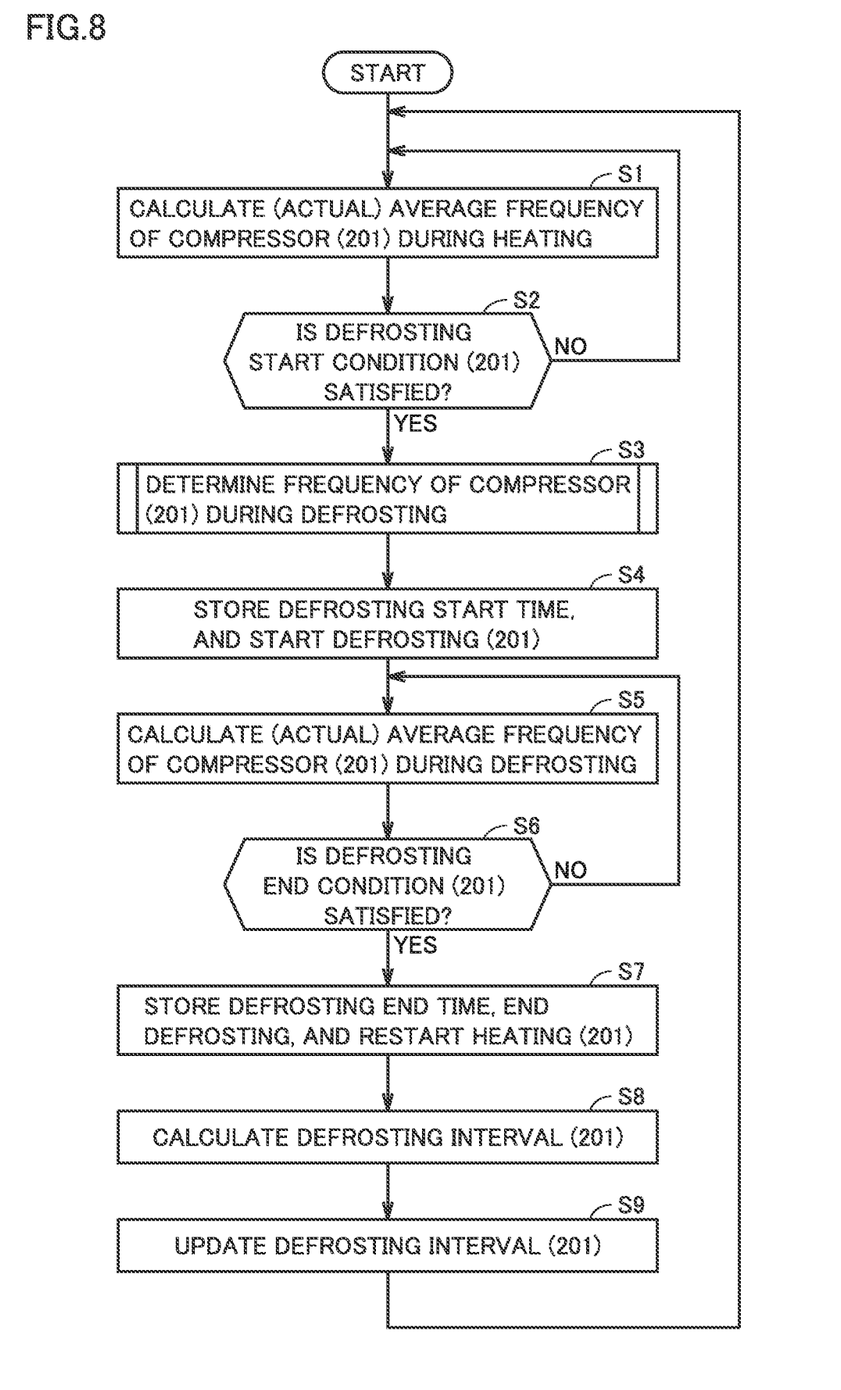
FIG. 8 is a flowchart illustrating control during defrosting by a first refrigeration cycle unit 201.
Figure 9:
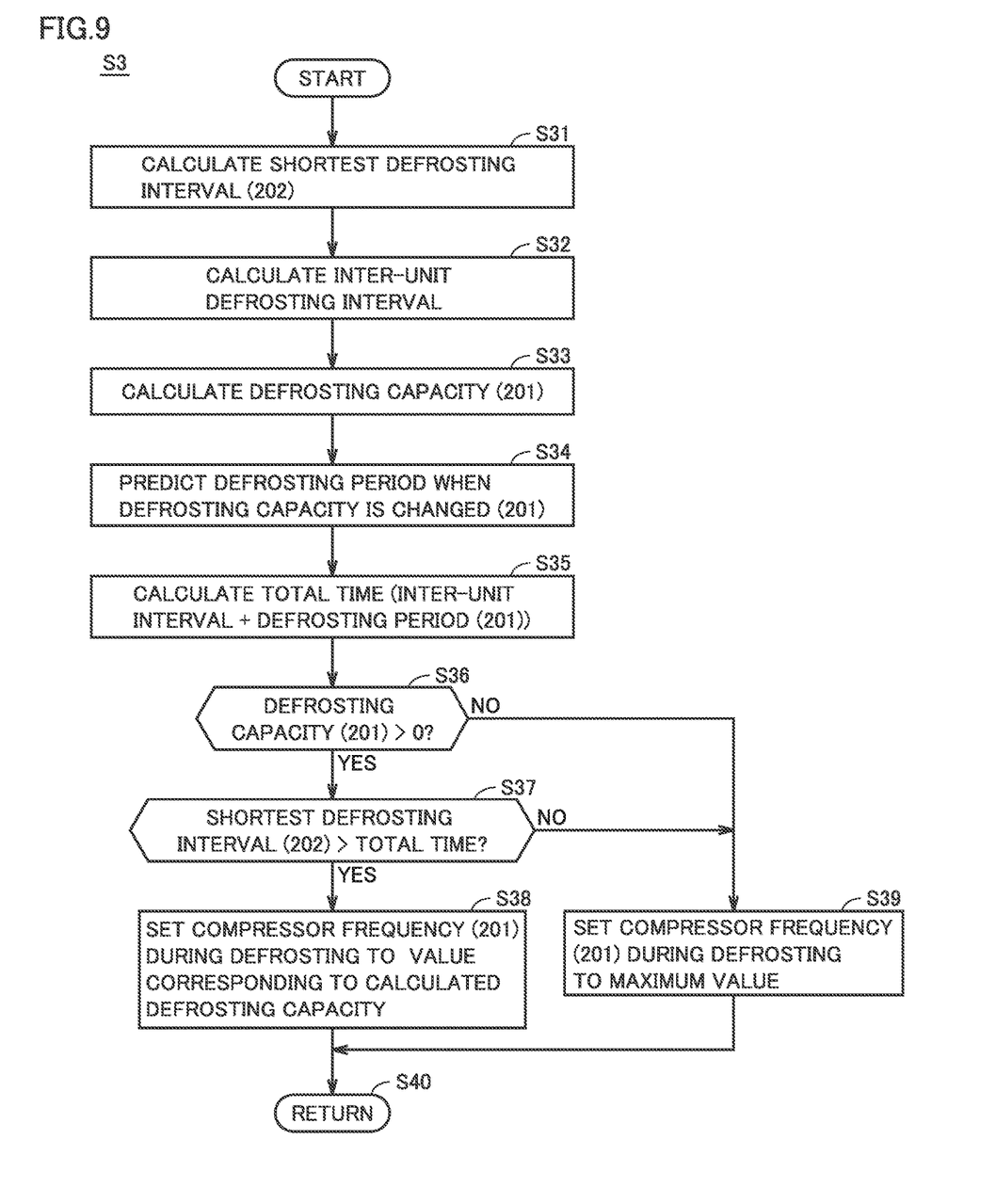
FIG. 9 is a flowchart illustrating details of an operation in step S3 of FIG. 8.

FIG. 8 is a flowchart illustrating control during defrosting by first refrigeration cycle unit 201. FIG. 9 is a flowchart illustrating details of an operation in step S3 of FIG. 8.

The processes of the flowcharts shown in FIGS. 8 and 9 are executed by control device 100 implemented by control unit 17 and control unit 27 that cooperate with each other. In the following mathematical formulas and the like, the subscripts "1" and "2" represent first refrigeration cycle unit 201 and second refrigeration cycle unit 202, respectively, the subscripts "ave" represent average, the subscripts "max" represent maximum, and the subscripts "min" represent minimum.

In step S1, control device 100 calculates the actual value of the average frequency, during heating, of compressor 11 of first refrigeration cycle unit 201. Specifically, average frequency $Fh_{ave1}$ is calculated in the order of the following formulas (1) to (3).

$$Th_1 = \Sigma dth_1 \quad (1)$$

$$Fh_1 = \Sigma dfh_1 \quad (2)$$

$$Fh_{ave1} = Fh_1/Th_1 \quad (3)$$

The formula (1) adds up the heating time to calculate total heating time $Th_1$. The formula (2) adds up the operational frequency per unit time of compressor 11 to calculate total frequency $Fh_1$. The formula (3) divides total frequency $Fh_1$ by total heating time $Th_1$ to calculate average frequency $Fh_{ave1}$ of compressor 11 during heating.

In step S2, control device 100 determines whether or not the defrosting start condition of first refrigeration cycle unit 201 is satisfied. For example, the defrosting start condition is satisfied when the refrigerant temperature at the outlet of first heat exchanger 13 operating as an evaporator or at the inlet of compressor 11, namely the evaporation temperature, is less than a threshold value.

When the defrosting start condition is not satisfied in step S2, the calculation of average frequency $Fh_{ave1}$ in step S1 is performed again. In contrast, when the defrosting start condition is satisfied in step S2, the operational frequency of compressor 11 of first refrigeration cycle unit 201 during a defrosting period is determined in step S3.

The time when the defrosting start condition is satisfied in step S2 corresponds to time t14 in FIG. 6. Details of the operation in the next step S3 are shown in FIG. 9.

Initially, in step S31, control device 100 calculates shortest defrosting interval $Tinth_{min2}$ of second refrigeration cycle unit 202 in accordance with the formula (4).

$$Tinth_{min2}=Tinth_2 \times Fh_{ave2}/Fh_{max2} \tag{4}$$

Then, in step S32, control device 100 calculates inter-unit defrosting interval $Tint_{21}$ in accordance with the formula (5), where $time2_{d-h}$ represents the time when second refrigeration cycle unit 202 makes transition from defrosting to heating, which corresponds to time t13 in FIG. 6, and $time1_{h-d}$ represents the time when first refrigeration cycle unit 201 makes transition from heating to defrosting, which corresponds to time t14 in FIG. 6. Inter-unit defrosting interval $Tint_{21}$ is specifically a period during which both the two refrigeration cycle units perform heating, between the preceding and following defrosting operations.

$$Tint_{21}=(time1_{h-d}-time2_{d-h}) \tag{5}$$

Further in step S33, in accordance with the formula (6), control device 100 calculates defrosting capacity $defQ_1$ of first refrigeration cycle unit 201 for keeping the water temperature unchanged. The first term of the formula (6) is the maximum heating capacity 100% of second refrigeration cycle unit 202 that keeps heating during the defrosting shown in FIG. 5. The second term of the formula (6) is the load capacity delivered to load device 3 during the immediately preceding period during which both first refrigeration cycle unit 201 and second refrigeration cycle unit 202 perform heating operation. The load capacity corresponds to 40%+40% shown in FIG. 3.

$$defQ_1=100-[(Fh_{ave2}/Fh_{max2}+Fh_{ave1}/Fh_{max1}) \times 100] \tag{6}$$

Subsequently in step S34, control device 100 predicts the defrosting period of first refrigeration cycle unit 201 when the defrosting capacity is changed, in accordance with the formula (7), where $td_1$ represents the immediately preceding defrosting period of first refrigeration cycle unit 201.

$$Tintd_1=td_1 \times (defQ_1/100)/(Fd_{ave1}/Fd_{max1}) \tag{7}$$

Further in step S35, control device 100 calculates total time $Tt_1$ of the inter-unit defrosting interval and the defrosting time in accordance with the formula (8).

$$Tt_1=Tint_{21}+Tintd_1 \tag{8}$$

Then, in step S36, control device 100 determines whether or not defrosting capacity $defQ_1$ calculated in step S33 is positive. When $defQ_1 > 0$ is satisfied (YES in S36), control device 100 determines, in step S37, whether or not shortest defrosting interval $Tinth_{min2}$ of second refrigeration cycle unit 202 is longer than total time $Tt_1$.

When $Tinth_{min2} > Tt_1$ is satisfied (YES in S37), control device 100 calculates, in accordance with the formula (9), operational frequency $defHz_1$ of compressor 11 during defrosting, and applies it to defrosting operation.

$$defHz_1=(defQ_1/100) \times Fd_{max1} \tag{9}$$

This operational frequency $defHz_1$ corresponds to the operational frequency of compressor 11 from time t14 to time t15 in FIG. 6.

In contrast, when the condition is not satisfied in step S36 or S37 (NO in S36 or NO in S37), control device 100 sets the operational frequency of compressor 11 during defrosting to maximum value $F_{max}$ in step S39. In this case, defrosting operation similar to the defrosting operation of second refrigeration cycle unit 202 from time t10 to time t11 and from time t12 to time t13 in FIG. 6 is performed.

Referring again to FIG. 8, after the operational frequency of compressor 11 during defrosting is determined in step S3, control device 100 stores defrosting start time $time1_{h-d}$ of first refrigeration cycle unit 201 and starts defrosting in step S4. During defrosting, when a defrosting end condition, which is a condition for ending defrosting, is not satisfied (NO in S6), the actual value of the average frequency of compressor 11 during defrosting is calculated in step S5, in the order of the following formulas (10), (11), and (12).

$$Td_1=\Sigma dtd_1 \tag{10}$$

$$Fd_1=\Sigma dfd_1 \tag{11}$$

$$Fd_{ave1}=Fd_1/Td_1 \tag{12}$$

When the defrosting end condition is satisfied in step S6, control device 100 stores defrosting end time $time1_{d-h}$, ends defrosting operation, and restarts heating operation in step S7. Further in step S8, control device 100 calculates defrosting interval $Tinth_1$ in accordance with the following formula (13).

$$Tinth_1=(time1_{h-d}-time1_{d-h}) \tag{13}$$

Calculated defrosting interval $Tinth_1$ is updated in step S9 from the defrosting interval stored previously, and used for calculating the operational frequency of the compressor during defrosting when the defrosting start condition is satisfied next time, and determining whether to apply the operational frequency or not.

FIGS. 8 and 9 described above illustrate how the defrosting capacity is determined provisionally, when the defrosting start condition of first refrigeration cycle unit 201 is satisfied; and illustrate that it is predicted whether or not overlapping of defrosting periods occurs when defrosting operation is performed with the provisionally determined defrosting capacity; and the provisionally determined defrosting capacity is applied when there is no overlapping of defrosting periods.

A similar process is also performed when the defrosting start condition of second refrigeration cycle unit 202 is satisfied.

Figure 10:
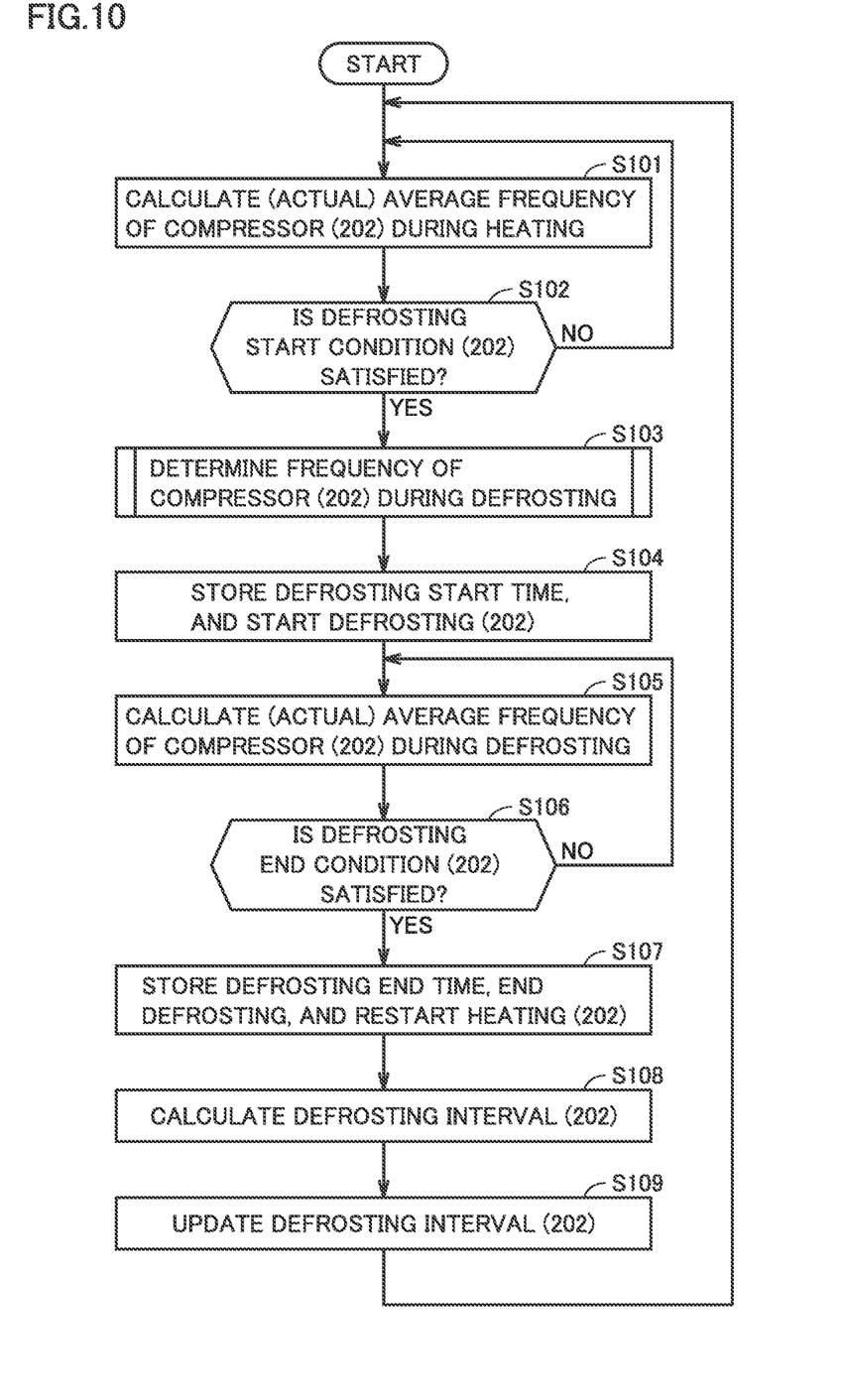
FIG. 10 is a flowchart illustrating control during defrosting by a second refrigeration cycle unit 202.
Figure 11:
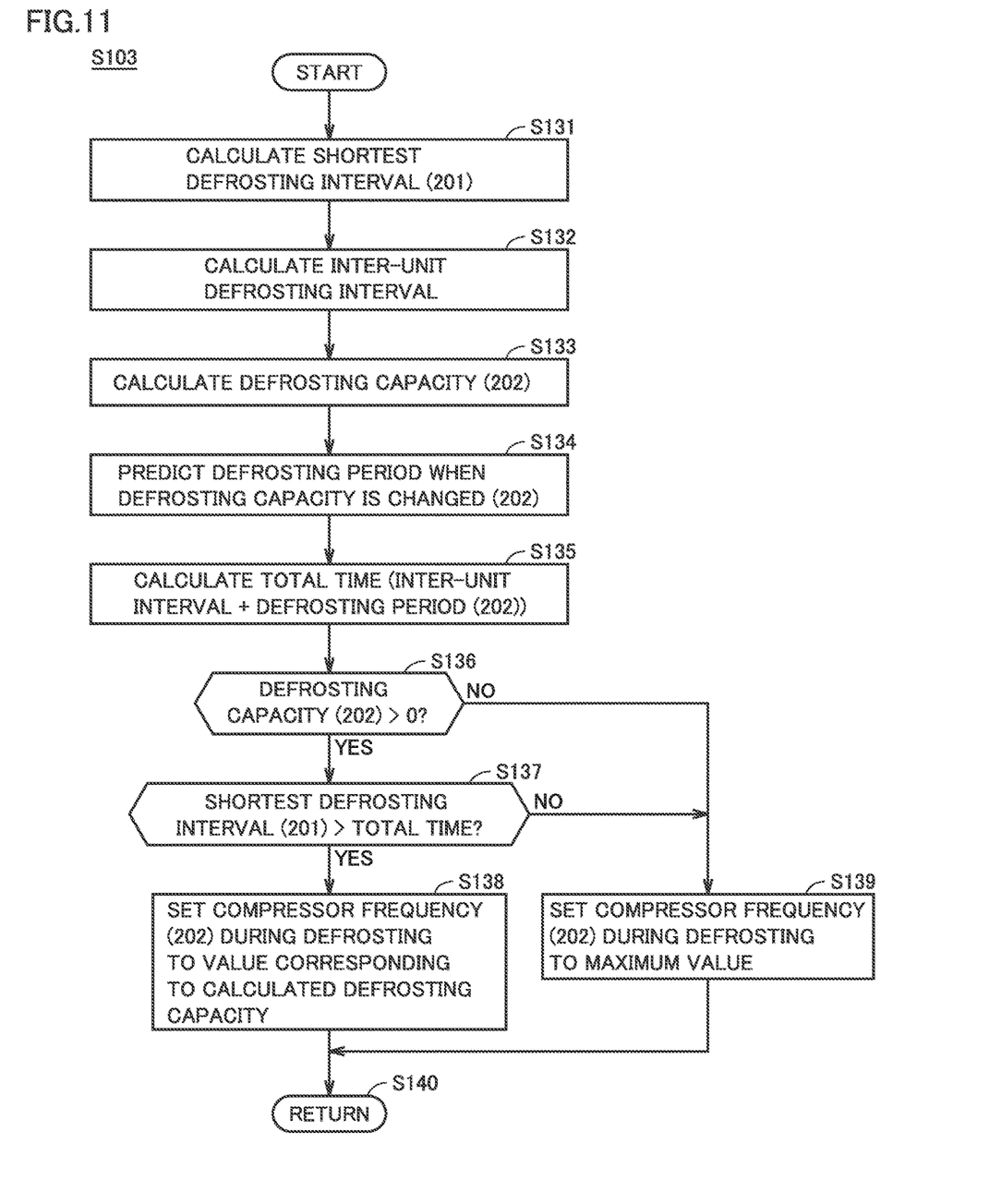
FIG. 11 is a flowchart illustrating details of an operation in step S103 of FIG. 10.

FIG. 10 is a flowchart illustrating control during defrosting by second refrigeration cycle unit 202. FIG. 11 is a flowchart illustrating details of an operation in step S103 of FIG. 10.

The processes of the flowcharts shown in FIGS. 10 and 11 are executed by control device 100 implemented by control unit 17 and control unit 27 that cooperate with each other.

In step S101, control device 100 calculates the actual value of the average frequency, during heating, of compressor 21 of second refrigeration cycle unit 202. Specifically, average frequency $Fh_{ave2}$ is calculated in the order of the following formulas (21) to (23).

$$Th_2=\Sigma dth_2 \tag{21}$$

$$Fh_2=\Sigma dfh_2 \tag{22}$$

$$Fh_{ave2}=Fh_2/Th_2 \tag{23}$$

The formula (21) adds up the heating time to calculate total heating time $Th_2$. The formula (22) adds up the operational frequency per unit time of compressor 21 to calculate total frequency $Fh_2$. The formula (23) divides the total frequency $Fh_2$ by the total heating time $Th_2$ to calculate average frequency $Fh_{ave2}$ of compressor 21 during heating.

In step S102, control device 100 determines whether or not the defrosting start condition of second refrigeration cycle unit 202 is satisfied. For example, the defrosting start condition is satisfied when the refrigerant temperature at the outlet of first heat exchanger 23 operating as an evaporator or at the inlet of compressor 21, namely the evaporation temperature, is less than a threshold value.

When the defrosting start condition is not satisfied in step S102, the calculation of average frequency $Fh_{ave2}$ in step S101 is performed again. In contrast, when the defrosting start condition is satisfied in step S102, the operational frequency of compressor 21 of second refrigeration cycle unit 202 during a defrosting period is determined in step S103.

The time when the defrosting start condition is satisfied in step S102 corresponds to time t16 in FIG. 6. Details of the operation in the next step S103 are shown in FIG. 11.

Initially, in step S131, control device 100 calculates shortest defrosting interval $Tinth_{min1}$ of first refrigeration cycle unit 201 in accordance with the formula (24).

$$Tinth_{min1}=Tinth_1 \times Fh_{ave1}/Fh_{max1} \quad (24)$$

Then, in step S132, control device 100 calculates inter-unit defrosting interval $Tint_{12}$ in accordance with the formula (25), where $time1_{d-h}$ represents the time when first refrigeration cycle unit 201 makes transition from defrosting to heating, which corresponds to time t15 in FIG. 6, and $time2_{h-d}$ represents the time when second refrigeration cycle unit 202 makes transition from heating to defrosting, which corresponds to time t16 in FIG. 6. Inter-unit defrosting interval $Tint_{12}$ is specifically a period during which both the two refrigeration cycle units perform heating, between the preceding and following defrosting operations.

$$Tint_{12}=(time2_{h-d}-time1_{d-h}) \quad (25)$$

Further in step S133, in accordance with the formula (26), control device 100 calculates defrosting capacity $defQ_2$ of second refrigeration cycle unit 202 for keeping the water temperature unchanged. The first term of the formula (26) is the maximum heating capacity 100% of first refrigeration cycle unit 201 that keeps heating during the defrosting, when first refrigeration cycle unit 201 performs heating and second refrigeration cycle unit 202 performs defrosting, which is opposite to the condition shown in FIG. 5. The second term of the formula (26) is the load capacity delivered to load device 3 during the immediately preceding period during which both first refrigeration cycle unit 201 and second refrigeration cycle unit 202 perform heating operation. The load capacity corresponds to 40%+40% shown in FIG. 3.

$$defQ_2=100-[(Fh_{ave1}/Fh_{max1}+Fh_{ave2}/Fh_{max2}) \times 100] \quad (26)$$

Subsequently in step S134, control device 100 predicts the defrosting period of second refrigeration cycle unit 202 when the defrosting capacity is changed, in accordance with the formula (27).

$$Tintd_2=td_2 \times (defQ_2/100)/(Fd_{ave2}/Fd_{max2}) \quad (27)$$

Further in step S135, control device 100 calculates total time $Tt_2$ of the inter-unit defrosting interval and the defrosting time in accordance with the formula (28).

$$Tt_2=Tint_{12}+Tintd_2 \quad (28)$$

Then, in step S136, control device 100 determines whether or not defrosting capacity $defQ_2$ calculated in step S133 is positive. When $defQ_2>0$ is satisfied (YES in S136), control device 100 determines, in step S137, whether or not shortest defrosting interval $Tinth_{min1}$ of first refrigeration cycle unit 201 is longer than total time $Tt_2$.

When $Tinth_{min1}>Tt_2$ is satisfied (YES in S137), control device 100 calculates, in accordance with the formula (29), operational frequency $defHz_2$ of compressor 21 during defrosting, and applies it to defrosting operation.

$$defHz_2=(defQ_2/100) \times Fd_{max2} \quad (29)$$

This operational frequency $defHz_2$ corresponds to the operational frequency of compressor 21 from time t16 to time t17 in FIG. 6.

In contrast, when the condition is not satisfied in step S136 or S137 (NO in S136 or NO in S137), control device 100 sets the operational frequency of compressor 21 during defrosting to maximum value $F_{max}$ in step S139. In this case, defrosting operation of second refrigeration cycle unit 202, similar to the defrosting operation of first refrigeration cycle unit 201 from time t10 to time t11 and from time t12 to time t13 in FIG. 6, is performed.

Referring again to FIG. 10, after the operational frequency of compressor 21 during defrosting is determined in step S103, control device 100 stores defrosting start time $time2_{h-d}$ of second refrigeration cycle unit 202 and starts defrosting in step S104. During defrosting, when a defrosting end condition is not satisfied (NO in S106), the actual value of the average frequency of compressor 21 during defrosting is calculated in step S105, in the order of the following formulas (30), (31), and (32).

$$Td_2=\Sigma dtd_2 \quad (30)$$

$$Fd_2=\Sigma dfd_2 \quad (31)$$

$$Fd_{ave2}=Fd_2/Td_2 \quad (32)$$

When the defrosting end condition is satisfied in step S106, control device 100 stores defrosting end time $time2_{d-h}$, ends defrosting operation, and restarts heating operation in step S107. Further in step S108, control device 100 calculates defrosting interval $Tinth_2$ in accordance with the following formula (33).

$$Tinth_2=(time2_{h-d}-time2_{d-h}) \quad (33)$$

Calculated defrosting interval $Tinth_2$ is updated in step S109 from the defrosting interval stored previously, and used for calculating the operational frequency of the compressor during defrosting when the defrosting start condition is satisfied next time, and determining whether to apply the operational frequency or not.

FIGS. 10 and 11 described above illustrate how the defrosting capacity is determined provisionally, when the defrosting start condition of second refrigeration cycle unit 202 is satisfied. It is further illustrated that it is determined whether or not overlapping of defrosting periods occurs when defrosting operation is performed with the provisionally determined defrosting capacity, and the provisionally determined defrosting capacity is applied when there is no overlapping of defrosting periods.

Finally, the present embodiment is summarized with reference again to the drawings. Heat source device 2 shown in FIG. 1 includes first refrigeration cycle unit 201, second refrigeration cycle unit 202, and control device 100.

First refrigeration cycle unit 201 and second refrigeration cycle unit 202 are disposed in a common circulation path for water, and each of first refrigeration cycle unit 201 and second refrigeration cycle unit 202 has an independent refrigerant circuit using refrigerant and is configured to control the water temperature. Control device 100 is configured to control a heating capacity during a heating operation and a defrosting capacity during a defrosting operation of each of first refrigeration cycle unit 201 and second refrigeration cycle unit 202. When a first defrosting start condition is satisfied, control device 100 is configured to determine the defrosting capacity in the defrosting operation of first refrigeration cycle unit 201, and start the defrosting operation. The first defrosting start condition is satisfied, for example, when the evaporation temperature of first refrigeration cycle unit 201 is lower than a threshold value, as determined in step S2 of FIG. 8.

The defrosting capacity of first refrigeration cycle unit 201 is determined to fall within a range satisfying a first determination condition and within a range satisfying a second determination condition.

The first determination condition is a condition that a sum of
- a load capacity of load device 3 using heat of a heat medium such as water when the first defrosting start condition is satisfied, and
- the defrosting capacity of first refrigeration cycle unit 201 does not exceed the heating capacity of second refrigeration cycle unit 202. In accordance with the formula (6), defrosting capacity $defQ_1$ of first refrigeration cycle unit 201 is calculated to satisfy the first determination condition, so as to keep the water temperature unchanged.

The second determination condition is a condition that the total time $Tt_1$ that is a sum of
- inter-unit defrosting interval $Tint_{21}$, and
- defrosting period $Tintd_1$ of first refrigeration cycle unit 201 does not exceed shortest defrosting interval $Tinth_2$ of second refrigeration cycle unit 202, where shortest defrosting interval $Tinth_{min2}$ is a period when second refrigeration cycle unit 202 is operated at an upper limit of the heating capacity, and inter-unit defrosting interval $Tinth_{min2}$ is a period from a time when the defrosting operation of second refrigeration cycle unit 202 is completed immediately before, to a time when the first defrosting start condition is satisfied. For example, control device 100 compares, in step S37 of FIG. 9, total time $Tt_1$ calculated in accordance with the formulas (7) and (8) with shortest defrosting interval $Tinth_{min2}$ calculated in accordance with the formula (4), to determine whether or not the second determination condition is satisfied.

Preferably, first refrigeration cycle unit 201 includes compressor 11, or an inverter compressor, for example, having an operational frequency that is variable. Control device 100 is configured to calculate, when both the first determination condition and the second determination condition are satisfied, the operational frequency of compressor 11 in the defrosting operation in accordance with the formula (9), so that the determined operational frequency corresponds to the determined defrosting capacity of first refrigeration cycle unit 201, and change the operational frequency to the calculated operational frequency.

Preferably, when both first refrigeration cycle unit 201 and second refrigeration cycle unit 202 perform the heating operation at a time when the first defrosting start condition is satisfied, control device 100 is configured to calculate a total value of the heating capacity of first refrigeration cycle unit 201 and the heating capacity of second refrigeration cycle unit 202, and calculate a difference, as defrosting capacity $defQ_1$ satisfying the first determination condition, between the total value and a maximum heating capacity of second refrigeration cycle unit 202. For example, control device 100 calculates defrosting capacity $defQ_1$ in accordance with the formula (6).

Preferably, control device 100 is configured to apply, as new defrosting period $Tintd_1$, a value determined by multiplying a ratio by immediately preceding defrosting period $td_1$ of first refrigeration cycle unit 201, where the ratio is a ratio between defrosting capacity $100 \times (Fd_{ave1}/Fd_{max1})$ during immediately preceding defrosting period $td_1$ of first refrigeration cycle unit 201, and defrosting capacity $defQ_1$ determined to satisfy the first determination condition, and control device 100 is configured to determine whether or not the second determination condition is satisfied.

Preferably, control device 100 is configured to determine the shortest defrosting interval $Tinth_{min2}$ by: calculating a product of an actual value of an immediately preceding defrosting interval $Tinth_2$ of second refrigeration cycle unit 202, and average frequency $Fh_{ave2}$ corresponding to an actual value of a heating capacity of second refrigeration cycle unit 202 during the immediately preceding defrosting interval; and dividing the product by operational frequency $Fh_{max2}$ corresponding to an upper limit of the heating capacity of second refrigeration cycle unit 202.

Preferably, when the first defrosting start condition is satisfied, control device 100 is configured to determine the defrosting capacity of first refrigeration cycle unit 201 to satisfy the first determination condition, and calculate defrosting period $Tintd_1$ for which the defrosting operation is to be performed with the determined defrosting capacity of first refrigeration cycle unit 201, in accordance with the formula (7). Control device 100 is configured to determine, when calculated defrosting period $Tintd_1$ does not satisfy the second determination condition, the defrosting capacity of first refrigeration cycle unit 201 to minimize the defrosting period of first refrigeration cycle unit 201.

In the configuration shown in FIG. 1, heat source device 2, load device 3, and pump 6 are arranged separately. Alternatively, second heat exchangers 16, 26 of heat source device 2 may be separated and combined with pump 6 to serve as a branch unit. A main part of control device 100 may be disposed in any of heat source device 2 and load device 3. While water is described herein as an example of the heat medium, the heat medium may be another medium as long as it transfers heat. For example, brine may be used instead of water.

It should be construed that the embodiments disclosed herein are given by way of illustration in all respects, not by way of limitation. It is intended that the scope of the present invention is defined by claims, not by the description of the embodiments above, and encompasses all modifications and variations equivalent in meaning and scope to the claims.

The invention claimed is:
1. A refrigeration cycle apparatus comprising:
  a first refrigeration cycle unit and a second refrigeration cycle unit disposed in a common circulation path for a heat medium, each of the first refrigeration cycle unit and the second refrigeration cycle unit having an independent refrigerant circuit using refrigerant, each of the first refrigeration cycle unit and the second refrigeration cycle unit being configured to control temperature of the heat medium; and
  a control device configured to control a heating capacity during a heating operation and a defrosting capacity during a defrosting operation of each of the first refrigeration cycle unit and the second refrigeration cycle unit, wherein when a first defrosting start condition is satisfied, the control device is configured to determine the defrosting capacity in the defrosting operation of the first refrigeration cycle unit, and start the defrosting operation, the defrosting capacity of the first refrigeration cycle unit is determined to fall within a range satisfying a first determination condition and within a range satisfying a second determination condition, the first determination condition is a condition that a sum of
- a load capacity of a load device using heat of the heat medium when the first defrosting start condition is satisfied, and
- the defrosting capacity of the first refrigeration cycle unit does not exceed the heating capacity of the second refrigeration cycle unit, and the second determination condition is a condition that a sum of
- an inter-unit defrosting interval, and
- a defrosting period of the first refrigeration cycle unit does not exceed a shortest defrosting interval of the second refrigeration cycle unit, the shortest defrosting interval being a period when the second refrigeration cycle unit is operated at an upper limit of the heating capacity, the inter-unit defrosting interval being a period from a time when the defrosting operation of the second refrigeration cycle unit is completed to a time when the first defrosting start condition is satisfied.

2. The refrigeration cycle apparatus according to claim 1, wherein when the first defrosting start condition is satisfied, the control device is configured to
- determine the defrosting capacity of the first refrigeration cycle unit to satisfy the first determination condition,
- calculate a defrosting period for which the defrosting operation is to be performed with the determined defrosting capacity of the first refrigeration cycle unit, and
- determine, when the calculated defrosting period does not satisfy the second determination condition, the defrosting capacity of the first refrigeration cycle unit to minimize the defrosting period of the first refrigeration cycle unit.

3. The refrigeration cycle apparatus according to claim 1, wherein
- the first refrigeration cycle unit includes a compressor having an operational frequency that is variable, and
- the control device is configured to change, when both the first determination condition and the second determination condition are satisfied, the operational frequency of the compressor in the defrosting operation, so that the changed operational frequency corresponds to the determined defrosting capacity of the first refrigeration cycle unit.

4. The refrigeration cycle apparatus according to claim 1, wherein when both the first refrigeration cycle unit and the second refrigeration cycle unit perform the heating operation at a time when the first defrosting start condition is satisfied, the control device is configured to calculate a total value of the heating capacity of the first refrigeration cycle unit and the heating capacity of the second refrigeration cycle unit, and calculate a difference, as a defrosting capacity satisfying the first determination condition, between the total value and a maximum heating capacity of the second refrigeration cycle unit.

5. The refrigeration cycle apparatus according to claim 1, wherein the control device is configured to
- apply, as a new defrosting period, a value determined by multiplying a ratio by an immediately preceding defrosting period of the first refrigeration cycle unit, the ratio being a ratio between a defrosting capacity during the immediately preceding defrosting period of the first refrigeration cycle unit, and the defrosting capacity determined to satisfy the first determination condition, and
- determine whether or not the second determination condition is satisfied.

6. The refrigeration cycle apparatus according to claim 1, wherein the control device is configured to determine the shortest defrosting interval by
- calculating a product of an actual value of an immediately preceding defrosting interval of the second refrigeration cycle unit, and an actual value of a heating capacity of the second refrigeration cycle unit during the immediately preceding defrosting interval, and
- dividing the product by an upper limit of the heating capacity of the second refrigeration cycle unit.

* * * * *